June 23, 1964     W. R. BEHRENS     3,138,210
FRONT-END LOADER ATTACHED CULTIVATOR
Filed Sept. 19, 1961
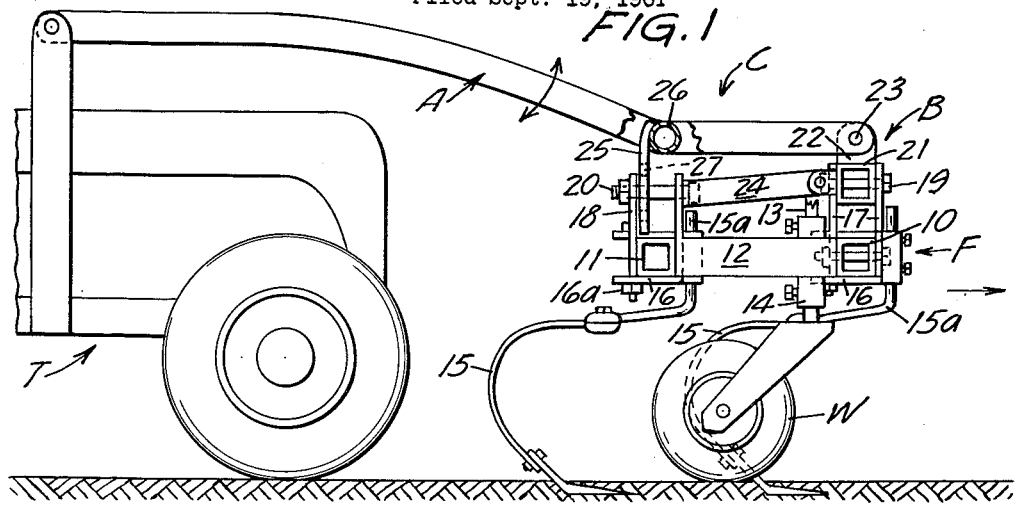
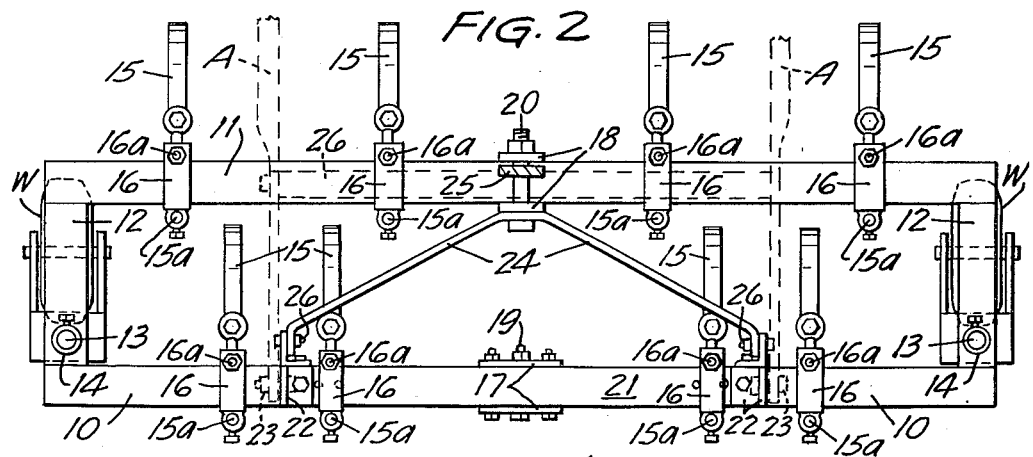
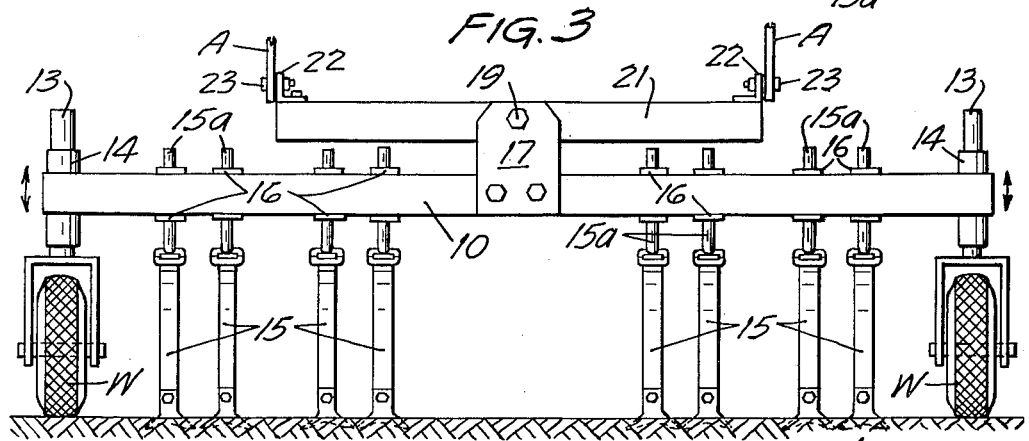
INVENTOR
WALTER R. BEHRENS
BY Williamson & Palmatier
ATTORNEYS

United States Patent Office 3,138,210
Patented June 23, 1964

3,138,210
FRONT-END LOADER ATTACHED CULTIVATOR
Walter R. Behrens, Rte. 1, Minot, N. Dak.
Filed Sept. 19, 1961, Ser. No. 139,283
5 Claims. (Cl. 172—277)

This invention relates to earth working implements and in particular to a cultivator attachment adapted to be suspended from and supported by a boom element carried by and attached to a mobile vehicle such as a tractor.

An object of my invention is an earth working implement such as a cultivator attachment adapted to be suspended from a boom element carried by a propelling vehicle such as a tractor for cultivating row crops such as corn, soybeans, potatoes, sugar beets and the like.

Still another object is an implement of the class described which is capable of adjustment for depth of cut and angle of cut or leveling and is likewise adapted for free swinging movement about a generally horizontal axis parallel to the direction of movement to permit said cultivator attachment to automatically adjust itself during use to the irregular contours of the ground being worked, and follow the contour of the ground at all times.

Still another object is an implement of the class described which is readily mounted and detached from conventional boom elements to leave said boom elements free for other uses when the cultivator attachment is not being employed.

Still another object is a cultivator attachment for row crops of the class described in which the earth working tools carried thereby are capable of selective lateral adjustment relative to the direction of movement to accommodate such cultivator to a variable number of rows and to rows having variable spacing therebetween.

These and other objects and advantages of my invention will more fully appear from the following description made in connection with the accompanying drawings wherein like reference characters refer to the same parts throughout the several views and in which:

FIG. 1 is a side elevational view showing the cultivator implement attachment of our invention in mounted operational relationship with a tractor supported loader boom;

FIG. 2 is a top plan view; and

FIG. 3 is a front elevational view.

Referring to the drawings for a more detailed description of the preferred embodiment of my invention illustrated therein, FIG. 1 illustrates a tractor T carrying a pair of boom elements or arms A extending forwardly thereof and being adapted to be raised and lowered by suitable hydraulic mechanism from the cab of the tractor, the forward end of the boom A having attached thereto and suspended therefrom the cultivator attachment of my invention indicated generally by the letter C.

The cultivator attachment includes a bolster structure detachably and fixedly secured to the ends of the loader booms, said bolster structure being indicated generally by the letter B which bolster structure has pivotally suspended therefrom a floating tool supporting frame structure indicated generally by the letter F. The frame F in turn is mobilely supported by means of a pair of caster wheels W.

The cultivator frame F includes a rigid frame structure comprising elongate front and back frame members 10 and 11 respectively and preferably of boxed channel construction, which are rigidly interconnected by side members 12. The side members 12 are provided with suitable vertically disposed openings for receiving the legs 13 of the caster wheels W which legs 13 are vertically movable up and down with respect to said side members 12 for adjusting the height of said frame F above the ground and depth of cut of the earth working tools carried by said frame. To adjustably maintain the frame F at any given operating height or elevation above ground level, each leg 13 is provided with a pair of lock collars 14 disposed above and below the side members 12, which collars 14 are slidably engaged with the legs 13 and are adjustably secured thereto by any suitable means, the inner faces of the collars preferably abutting with the side members 12 to prevent play in the legs 13 during use.

The frame members 10 and 11 are provided with a plurality of earth working tools such as the arcuate tines or shovels 15 which are adjustably fastened to said members 10 and 11 in staggered relationship by any suitable releasable fastening means such as the clamps 16 which have the tine shanks 15a secured to the front face thereof, which clamps detachably enclose the frame members 10 and 11 and are secured thereto by means of fasteners such as the bolts 16a which rigidly secure the clamps 16 to the frames 10 and 11. Thus, said tines 15 may be attached or detached in any number desired and may be shifted longitudinally with respect to said members 10 and 11 to vary the distance between said tines 15 in accordance with the particular spacing of the rows to be cultivated.

The frame members 10 and 11 are each provided with a pair of upstanding ears or brackets 17 and 18 respectively, each pair of brackets being rigidly secured to the front and back of their respective frame members and located at the approximate transverse center of said elongate members 10 and 11. The ears 17 and 18 are provided with suitably aligned apertures for receiving suitable pivot elements such as the pivot pins 19 and 20 respectively.

The bolster structure B includes a rigid elongate frame member 21 similar to the front frame member 10 but somewhat shorter in length, said bolster member 21 being longitudinally aligned with said front member 10 and overlying the same in spaced apart relation therewith and disposed between the upstanding ears 17. The bolster member 21 is provided with suitably aligned apertures for receiving the pivot pin 19 to pivotally or swingingly support the front frame member 10 therefrom for swinging movement about a generally horizontal axis parallel to the direction of movement to enable the frame to follow the contour of the ground at all times.

The outer ends of the bolster member 21 are provided with a pair of adjustable upstanding ears 22 having suitable apertures therein for pivotally attaching the ears to the outer ends of the arms A for swinging suspension therefrom about an axis generally parallel to the length of said bolster member 21 and transverse to said arms and the direction of movement, the ears 22 being pivotally fastened to the boom arms A by means of suitable pivot elements or pins 23.

A wishbone-shaped reinforcing structure is provided by a pair of interconnected bracing members 24 which are each connected at their front end to the outer end of said bolster member 21 as at 26 and converge inwardly to be rigidly connected at their inner ends to the innermost ear 18 carried by the back frame member 11.

A depending dog 25 is provided with a vertical series of suitable apertures 27 for receiving the pivot pin 20 and is interposed between the back ears 18 and interconnected therewith by pivot pin 20 to pivotally suspend the back frame member 11 from the cross beam 26 which braces the boom arms rearwardly of the front outer end thereof. The upper end of said dog 25 may be fixedly secured to the cross beam 26 as by welding or may be detachably secured thereto as desired. The plurality of vertically spaced apertures 27 are for raising or lowering in adjustable fashion the rear frame member 11 to adjust the level of the frame F as desired and adjust the angle of cut of the tines or shovels 15. When the back frame member 11 is raised or lowered by vertical adjustment of the dog 25 with respect to the ears 18, the entire frame F and the bolster B pivot about the horizontal axis transverse to the direction of movement provided by the pivot elements 23.

To mount the cultivator attachment to the loader arms, the tractor is simply driven close to the cultivator attachment and the boom arms are lowered into a proper position above the cultivator so that the front outer end thereof may be pivotally attached to the bolster frame 21 by means of the bolster pins 23 and the cross beam pivotally supports the back of the frame by pivotally interconnecting the dog 25 with bracket members 18 by means of the pivot pin 20. The depth adjustment is simply made by raising or lowering the caster wheels as desired. The leveling of the frame is accomplished by inserting the pivot pin 20 in one of the apertures 27 of the dog 25 which will maintain the frame at the level or angle desired. The cultivator attachment is then ready for use. As the cultivator is driven forwardly by means of the tractor and the boom the frame F freely pivots about and from the bolster B, the sides moving up and down to automatically accommodate the frame to the contours of the ground being cultivated, which adjustment is automatically made by the free swinging relationship between the frame F and the bolster B provided by the pivot elements 19 and 20.

To transport the cultivator to or from the field the boom is simply raised a sufficient distance to enable the entire cultivator to be raised clear of the ground and the entire mounted unit is then driven to its destination.

From the foregoing the advantages of my invention are readily apparent. The cultivator attachment is readily adapted for easy mounting and demounting on a pair of boom arms, the entire implement is readily transported from place to place by means of the tractor and boom unit by simply raising the cultivator off the ground to transport position, and the cultivator attachment is readily capable of multiple adjustments for almost every conceivable type of adjustment which might be necessary. Thus, the depth of cut is adjusted by the movement of the caster wheels up and down, the level or angle of the frame is adjusted by simply raising or lowering the back end of the frame pivoting about the boom arms and the entire frame structure freely pivoting or swinging from the bolster structure to automatically accommodate itself to the irregular inclined contours of the ground being worked. In addition, the ears 22 which connect the bolster to the boom arms are readily adjustable for inward and outward movement relative to the sides thereof to permit the cultivator attachment to be readily attached to booms having varying spans between the arms thereof, and the earth working tools are readily adjustable for any width of row or spacing between rows.

Although the implement attachment of my invention has been described and illustrated as being a cultivator suspended from a pair of boom arms, it is to be understood that other types of tools may be substituted for the tools illustrated and the implement may be suspended from other types of suspending structure, such as a boom element providing a single boom arm.

It will, of course, be understood that various changes may be made in the form, details, arrangement and proportions of the parts without departing from the scope of our invention which consists of the matter shown and described herein and set forth in the appended claims.

What is claimed is:

1. The combination comprising a motor vehicle having boom means mounted thereon and extending forwardly thereof, a tool supporting frame, frame supporting means mounted on said boom means for pivotal movement of said frame supporting means relative to said boom means about a horizontal transverse axis, means for mounting said frame on said supporting means for pivotal movement of said frame relative to said supporting means about a horizontal axis paralleling the direction of travel, and vertically adjustable means interconnecting said boom means and said frame and supporting said frame for pivotal movement thereof about a horizontal axis paralleling the direction of travel and holding said frame against movement about said transverse axis.

2. The combination comprising a motor vehicle having boom means mounted thereon and extending forwardly thereof, a tool supporting frame, frame supporting means mounted on said boom means for pivotal movement of said supporting means relative to said boom means about a horizontal transverse axis, means for mounting said frame on said supporting means for pivotal movement of said frame relative to said supporting means about a horizontal axis paralleling the direction of travel, vertically adjustable second frame supporting means including first means connected to said boom means, second means connected to said frame, and means pivotally interconnecting said first and second means for pivotal movement of said second means and said frame about a horizontal axis paralleling the direction of travel, said first and second means cooperating to hold said frame against movement about said transverse axis.

3. The combination comprising a motor vehicle having boom means mounted thereon and extending forwardly thereof, a frame including a pair of elongate transversely disposed laterally spaced apart tool supporting frame members located forwardly of said vehicle, frame supporting means mounted on said boom means for pivotal movement of said supporting means relative to said boom means about a horizontal transverse axis, means for suspending the front portion of said frame from said supporting means for pivotal movement of said frame relative to said supporting means about a horizontal axis paralleling the direction of travel, and vertically adjustable means interconnecting the rear portion of said frame and said boom means and supporting said frame for pivotal movement of said frame relative to said boom means about a horizontal axis paralleling the direction of travel and holding said frame against movement about said transverse axis.

4. The combination comprising a motor vehicle having boom means mounted thereon and extending forwardly thereof, a frame including a pair of elongate transversely disposed laterally spaced apart tool supporting frame members located forwardly of said vehicle, frame supporting means mounted on said boom means for pivotal movement of said supporting means relative to said boom means about a horizontal transverse axis, means for suspending the front portion of said frame from said supporting means for pivotal movement of said frame relative to said supporting means about a horizontal axis paralleling the direction of travel, and second frame supporting means including first means connected to and suspended from said boom means, second means connected to the rear portion of said frame, means pivotally interconnecting said last named first and second means for pivotal movement of said second means and said frame about a horizontal axis paralleling the direction of travel, said first and second means being capable of relative vertical adjustment therebetween and cooperating to hold said frame against movement about said transverse axis.

5. The combination comprising a motor vehicle having a pair of laterally spaced apart boom members mounted thereon and extending forwardly thereof, a frame including a pair of elongate transversely disposed laterally spaced apart tool supporting frame members located forwardly of said vehicle, a frame supporting member extending between said boom members and pivotally connected thereto for pivotal movement about a horizontal transverse axis, means for suspending the leading frame member from said supporting member for piovtal movement of said frame relative to said supporting member about a horizontal axis paralleling the direction of travel, and an elongate second frame supporting member supported by said boom means and depending therefrom, said second member having a vertical series of apertures formed therein, bracket means mounted on the trailing frame member and extending upwardly therefrom, means selectively insertable in one of said apertures and connecting said bracket means and said second member and supporting said frame for pivotal movement of said frame about a horizontal axis paralleling the direction of travel, and vertically adjustable ground engaging caster wheel means carried by said frame.

References Cited in the file of this patent

UNITED STATES PATENTS

| | | |
|---|---|---|
| 1,562,709 | McNutt | Nov. 24, 1925 |
| 1,870,740 | Leiter | Aug. 9, 1932 |
| 2,070,155 | Day | Feb. 9, 1937 |
| 2,187,833 | Lock et al. | Jan. 23, 1940 |
| 2,626,550 | Derror et al. | Jan. 27, 1953 |
| 2,714,347 | Roessler | Aug. 2, 1955 |
| 2,934,155 | McMaster | Apr. 26, 1960 |
| 2,980,443 | Fina | Apr. 18, 1961 |